United States Patent
Bounds, III

(10) Patent No.: US 7,198,214 B1
(45) Date of Patent: Apr. 3, 2007

(54) CONDIMENT GRINDER

(75) Inventor: William Edward Bounds, III, Bellingham, WA (US)

(73) Assignee: William Bounds, Ltd., Torrance, CA (US)

( * ) Notice: Subject to any disclaimer, the term of this patent is extended or adjusted under 35 U.S.C. 154(b) by 0 days.

(21) Appl. No.: 11/352,480

(22) Filed: Feb. 9, 2006

(51) Int. Cl.
*A47J 42/04* (2006.01)
(52) U.S. Cl. .................. 241/169.1; 241/258
(58) Field of Classification Search ........... 241/168, 241/169, 169.1, 169.2, 258
See application file for complete search history.

(56) References Cited

U.S. PATENT DOCUMENTS 5,145,119 A * 9/1992 Lowe ................ 241/101.2
6,443,378 B1 * 9/2002 Huang et al. ........... 241/169.1
6,851,635 B2 * 2/2005 McCowin ............... 241/169.1

* cited by examiner

*Primary Examiner*—Faye Francis
(74) *Attorney, Agent, or Firm*—Edward Sokolski

(57) ABSTRACT

A condiment grinder, which includes a grinder element, which can be adjusted for either coarse or fine grinding. A top piece in the form of a receptacle is connected to the grinder shaft and is employed to rotate the grinder element. The top piece is mounted on the top of the condiment container, which is fabricated of a transparent material such as glass or plastic. The top piece has openings in its bottom, which run into the condiment container. A cover for the top piece has a circular extension along its edge, which can be removably snapped into the top edge of the top piece. The container is refilled with condiment by removing the cover and pouring the condiment into the top piece from where it drops into the container.

8 Claims, 1 Drawing Sheet

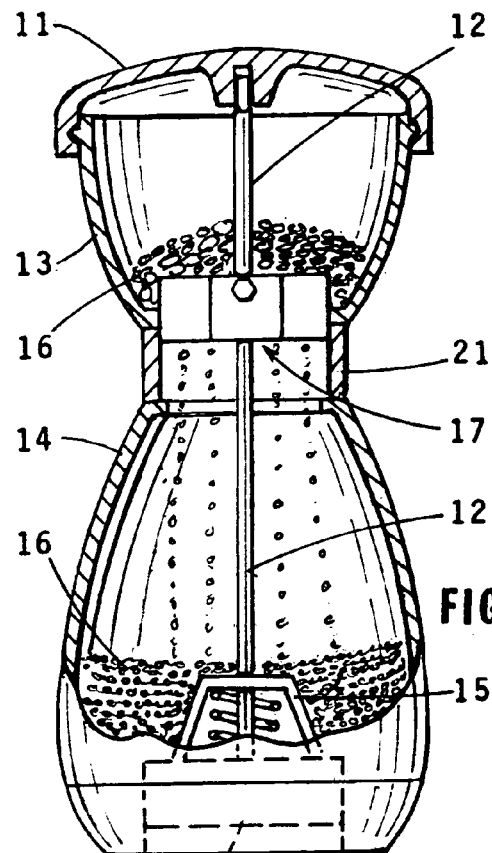
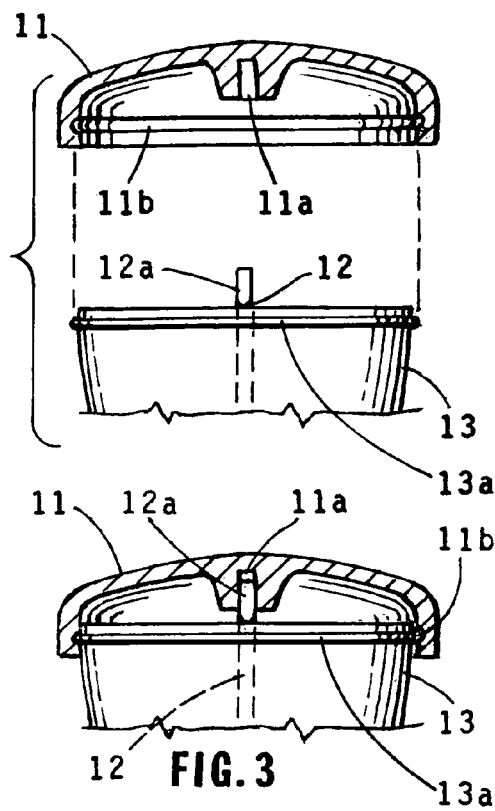
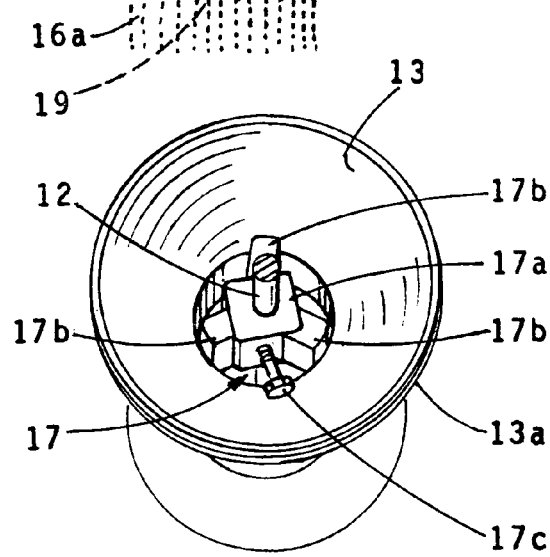
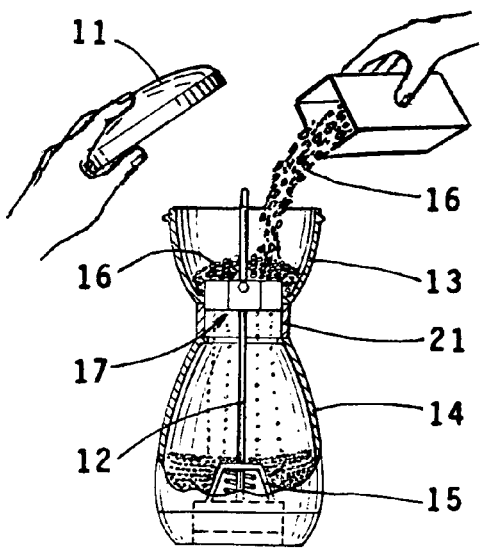

CONDIMENT GRINDER

BACKGROUND OF THE INVENTION

1. Field of the Invention

This invention relates to a grinder for grinding various condiments such as pepper and other spices as well as particles of chocolate and more particularly to such a grinder, which can more readily be refilled with condiment.

2. Description of the Related Art

A condiment grinder of the prior art is described in U.S. Pat. No. 6,851,635 issued on Feb. 8, 2005 to McCowin and assigned to William Bounds, Ltd, the assignee of the present application. This grinder employs grinding elements, which are rotatably driven by a handle, which is coupled, to the grinding elements through a drive shaft. In order to refill the grinder with condiment, it is necessary to remove the handle, which then provides access to the compartment in which the condiment is retained. The necessity for removing the handle sometimes makes the refilling of the condiment container a little more complicated that to be desired. In addition, in removing the handle a relatively small screw must be removed, this screw being subject to being misplaced or lost.

SUMMARY OF THE INVENTION

The device of the present invention provides a simpler more reliable grinder in which there is no handle for driving the grinder. The grinder mechanism is essentially the same as that of U.S. Pat. No. 6,851,635 issued Feb. 8, 2005 to McCowin and U.S. Pat. No. 3,168,256 issued Feb. 2, 1965 to Bounds, et al. but the mechanism for driving the grinder is much simpler. Further, the grinder can be refilled with condiment merely by pulling off a cover from a top piece and then pushing this cover back into place onto this piece. The top piece is coupled to the drive shaft, which drives the grinder, and the grinder is operated by rotating this top piece. The top piece is coupled to the shaft by a rectangular piece, which is attached to the shaft and several posts, which abut against the rectangular piece and are joined to the inner walls of the top piece. There is spacing between the posts to provide entry of the condiment into the condiment container located above the grinder. Thus, to refill the container, one need merely pull off the top cover and pour the condiment into the top piece. The grinding is achieved by rotating the top piece.

DESCRIPTION OF THE DRAWINGS

FIG. 1 is a front elevational view of a preferred embodiment of the invention;

FIG. 2 is a front elevational exploded view illustrating the top cover and top piece of the preferred embodiment separated from each other;

FIG. 3 is a front elevational view of the preferred embodiment illustrating the top cover and top piece connected to each other;

FIG. 4 is a top perspective view illustrating the preferred embodiment with the top cover removed; and FIG. 5 is a front elevational view of the preferred embodiment with the top cover removed and condiment being fed into the top piece.

DETAILED DESCRIPTION OF THE INVENTION

Referring to the FIGS, the device of the invention has a transparent container 14, which may be of glass or a clear plastic, in which the condiment is contained. Mounted at the base of the container is a condiment grinder 15, which as already noted, may be a grinder as described in U.S. Pat. No. 6,851,635 or U.S. Pat. No. 3,168,256. The grinder is rotatably driven by shaft 12.

Top piece 13 is slidably supported on container 14 for rotation relative thereto. The adjuster ring 21 when rotated raises and lowers shaft 12 to adjust the grinder for either coarse or fine grinding as described in U.S. Pat. Nos. 6,851,635 and 3,168,256.

As can best be seen in FIG. 4, top piece 13 is connected to shaft 12. The grinder is rotated by rotating the top piece 13 to grind condiment in the container 14. The top piece is connected to the shaft 12 by means of connector 17. The connector has a rectangular piece 17a, which is attached to the shaft by means of screw 17c. The rectangular piece 17a is connected to top piece 13 by means of posts 17b, which abut against rectangular piece 17a. The posts are joined to the top piece by means of cement, another suitable adhesive or other joinder means. The grinder 15 is rotated and grinds condiment when the top piece 13 is rotated. The ground condiment 16a passes out of the grinder through apertured bottom plate 19.

Top cover 11 has a circular extension 11b along its edge, which snaps into place on the top of the top piece and thus can readily be removed from and re-attached to the top piece. The cover also has an indentation 11a into which the top end 12a of shaft 12 slidably snaps.

As shown in FIG. 5, with the cover 11 removed, condiment 16 can be poured into the top piece 13 and falls through the spaces between posts 17b and rectangular piece 17a into condiment container 14. Thus, the refilling of the container is a simply operation, which does not require any disassembly but merely the lifting off top cover 23.

While the invention has been described and illustrated in detail, it is to be clearly understood that this is be way of example only and is not to be taken by way of limitation, the spirit and scope of the invention being determined by the following claims.

I claim:

1. A grinder for grinding condiment comprising:
   A grinder mechanism;
   a shaft connected to said grinder mechanism;
   a container for retaining the condiment;
   a top piece in the form of a receptacle connected to said container; said top piece having openings running from its interior to the interior of said container;
   means for coupling said top piece to said shaft, and
   a removable cover on the upper end of said top piece;
   said container being refilled with condiment by removing said cover and pouring said condiment into said top piece, the condiment passing from said top piece into said container,
   whereby the condiment is ground by rotating said top piece.

2. The grinder of claim 1 wherein said container is transparent.

3. The grinder of claim 1 where said means for coupling said top piece to said shaft comprises a substantially rectangular piece attached to said shaft and a plurality of posts which abut against said rectangular piece, said posts being attached to said top piece.

4. In a condiment grinder having a grinder mechanism, a shaft for driving said grinder mechanism and a container for containing condiment a device for facilitating the refilling of condiment into said container comprising;
- a top piece in the form of a receptacle, said top piece being supported on said container, an opening being formed between the interior of said top piece and the interior of said container, said opening being large enough to permit the passage of condiment from said top piece into said container;
- a removable cover on the upper end of said top piece; and
- means for connecting said top piece to said shaft in a manner such that rotation of said top piece effects rotation of said shaft.

5. The condiment grinder of claim 4 wherein said means for connecting said top piece to said shaft comprises a rectangular piece attached to said shaft and a plurality of posts attached to said top piece at one end thereof and abutting against said rectangular piece at the end thereof opposite to said one end.

6. The condiment grinder of claim 4 wherein said cover has a circular extension along its edge, said circular extension being snapped into position on the top edge of said top piece.

7. The condiment grinder of claim 4 wherein the top end of said shaft is connected to said cover.

8. The condiment grinder of claim 4 wherein said cover has a rim formed around the inner edge thereof, said rim removably snapping onto the top edge of said top piece.

* * * * *